Aug. 22, 1967     N. E. FARB ET AL     3,336,995
AIR CUSHION VEHICLE WITH THRUST AND ANTI-TORQUE CONTROL MEANS
Filed Feb. 23, 1965
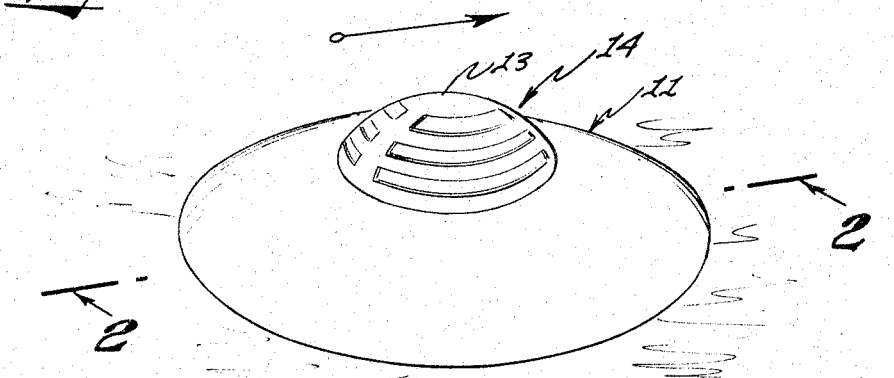
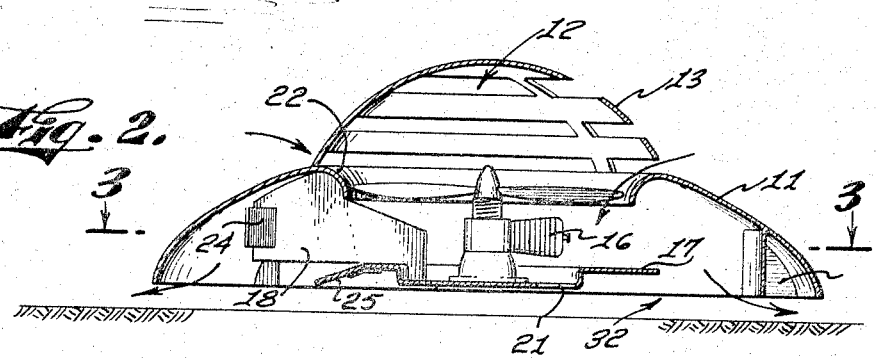
INVENTOR
NORMAN E. FARB
NORMAN D. HARRIS
By John A. Duffy
ATTORNEY

United States Patent Office 3,336,995
Patented Aug. 22, 1967

3,336,995
AIR CUSHION VEHICLE WITH THRUST AND
ANTI-TORQUE CONTROL MEANS
Norman E. Farb, 2106 Denise Ave., and Norman D.
Harris, 2545 E. Walnut Ave., both of Orange, Calif.
92667
Filed Feb. 23, 1965, Ser. No. 434,425
1 Claim. (Cl. 180—7)

This invention relates to air cushion vehicles and more particularly to a vehicle capable of movement through the air within a short distance of a ground surface in addition to climbing and descending in vertical or horizontal flight.

Vehicles designed to hover or fly close to a surface by ground effect are well known. Such vehicles are supported above a ground surface by a cushion of air developed between the underside of the vehicle and the ground surface. The air cushion is maintained by causing large amounts of air to flow under the vehicle to maintain a greater pressure below the vehicle than exists in the surrounding atmosphere.

Air cushion vehicles possess several advantages over both aircraft and ground vehicles such as the ability to hover a short distance above ground or move in any direction at any speed. The elimination of friction is particularly advantageous with comparatively little power required to operate the vehicle. However, since no part of the vehicle normally touches ground during operation, stability and directional control of the vehicle is difficult to maintain and become critical parameters of design.

Air cushion vehicles are known in which air is drawn by a power device such as a motor driven propeller through the center of a disc like structure downwardly to form an air cushion under the vehicle. These vehicles have been extremely unreliable due to the lack of control for stability, direction, and anti-torque. The rotation of the propeller creates a torque which because of no frictional contact with the ground surface causes the whole vehicle to spin at such speeds as to make the vehicle extremely unstable and usually inoperable. Efforts to correct for the torque condition have resulted in complicated devices which only added to the unreliability of the vehicle. Accordingly it is an object of this invention to provide an air cushion vehicle with improved control features.

The vehicle of this invention produces an air cushion in a simple and efficient manner by directing air through a passage or duct in the vehicle to the underside to create the desired differential pressure. A motor driven propeller is mounted on a suitable plate with air being directed through an annular orifice between the plate and the vehicle to create a cushion of air between the mounting plate and the ground surface. A simple and completely effective structure is provided to offset the torque produced by the propeller, to provide extremely versatile and reliable directional control of the vehicle, and to provide overall stability of the vehicle. These controls are achieved without the use of complicated, expensive, and unreliable components. The control structure provides the dual function of control and structural support for the entire device.

It is therefore another object of this invention to provide an air cushion vehicle having anti-torque, directional, and stability controls.

It is another object of this invention to provide anti-torque controls for an air cushion vehicle in which propeller driven air is directed downwardly through the vehicle to create an air cushion between the vehicle and ground.

It is still another object of this invention to provide stability and directional controls of simple and reliable structure to a disc shaped air cushion vehicle.

It is a further object of this invention to provide an anti-torque control for an air cushion vehicle in which an air cushion is created by the passage of air downwardly from the vehicle top.

Other objects of the present invention will become apparent from the accompanying specification read with the drawing in which:

FIGURE 1 is a perspective view of an air cushion vehicle according to a principal embodiment of the invention.

FIGURE 2 is a vertical sectional view of the vehicle of FIGURE 1 taken along the lines 2—2 of FIG. 1, FIGURE 3 is a horizontal sectional view of the device taken along the lines 3—3 of FIG. 2, and FIGURE 4 is a view of an air cushion vehicle according to a secondary embodiment of the invention.

As illustrated in FIGS. 1, 2, and 3 of the drawing the vehicle comprises a disc shaped shell 11 of unitary structure having an upper opening 12 defining an inlet port and covered by a dome 13 having a plurality of openings 14 for passing air. A lower opening 32 of the shell 11 has a diameter larger than the diameter of the upper opening 12. A propeller 15, driven by an engine 16 is disposed in the upper opening 12 to draw air into the shell 11 with the inner periphery of the shell 11 having a lipped portion 22. The engine 16 is supported on a mounting plate 17 which is joined to the shell 11 by a plurality of vertical struts or fins 18 positioned about the periphery of the plate 17. The plate 17 may have a central recess 21 for holding the engine 16 whose depth is determined by the longitudinal dimensions of the propeller 15 and the engine 16. The propeller 15 thus is positioned in the opening 12 a short distance under the top of the shell 11 at the edge of the curved lip 22 to provide a venturi passage for air. The fins 18, which number 3 in the illustrated embodiment, may be integral with the plate 17 to enhance the strength of the connection between the plate 17 and the shell 11.

The torque generated by the rotation of the propeller 15 is counteracted by the pressure differential on the fins 18 which thereby provide an anti-torque to balance the torque of the propeller 15. The fins 18 also contribute to the air cushion in that the horizontal component of velocity of the air being drawn through the shell is reduced in velocity by the fins 18 further enhancing the air cushion created beneath the vehicle. The number and location of the fins 18 depend upon the desired design parameters. In the embodiment illustrated three fins are provided with each of the fins extending in a line from the circumferential edge of the plate 17 and offset from the axial center of the plate by a predetermined angle noted in the drawing as $a$. The offset angle is in a direction away from the direction of rotation of the propeller 15. In other words as seen in FIG. 3 a fin 18 is offset by the angle $a$ with the propeller rotating in the direction shown by the arrows. Thus the position of the fins 18 is such as to generate an anti-torque force.

Directional control of the vehicle is provided by moment vanes 24 hingedly connected to the outer end of each of the fins 18. Rotation of the vanes 24 causes the vehicle to be directed in any desired rotational direction. The plate 17 has a segment 25 of its outer edge cut away and hingedly mounted for vertical movement to provide forward and backward directional control of the device. Other circular segments may be formed as desired to provide lateral control. A plurality of damping members or depressions 26 at least equal in number to the number of anti-torque fins 18 are symetrically located about the periphery of the shell 11 at the lower opening 32. The fins or depressions 26 serve to provide stability control for the device and may additionally be utilized to cause the vehicle to float on a liquid surface.

An air cushion is created between the plate 17 and a ground surface underneath the lower opening 32 by the generation of air flow when the propeller 15 is rotated. Air is drawn through the upper opening 12 acting as a high velocity venturi inlet and impinges against the plate 17 which diffuses the air and directs it at a low velocity downward to the lower opening 32 along an annular orifice defined by the space between the outer periphery of the plate 17 and the inner periphery of the shell 11 with the fins 18 providing anti-torque action in addition to contributing to the lowering of the velocity of the air. In effect the shell 11 acts as a duct between the upper opening 12 and the lower opening 32 with the air directed downward to provide an air cushion between the plate 17 and the ground surface. Lowering of the velocity control vanes 25 increases the velocity of air directed beneath the vane causing the vehicle to move forward in a direction defined by the center of the vane 25 and the axial center of the vehicle. Conversely raising the vane decreases the velocity causing the vehicle to move to the rear. As the directional moment vanes 24 are moved in and out the vehicel is caused to travel in any desired direction.

In FIG. 4 there is illustrated another embodiment of the invention in which an engine is mounted to the top of a domed shaped shell 42. Anti-torque fins 41, numbering 4, extend from the inner periphery of the shell 42 to a center circle with each of the fins 41 being tangent to the circle. The device of FIG. 4 does not have a diffuser plate and creates an air cushion between the shell 42 and a ground surface. It may also operate on a ceiling with the air pressure and the venturi nozzle producing a vacuum to hold the device.

The vehicle described may be constructed of any size including full size and is particularly useful as a model aircraft. When thus used guidance may be realized by attaching a guide wire to the shell 11 at a 90 degree angle or attaching a pair of guide wires to the vehicles at angles of 150° and 210°.

In operation the vehicle may travel above a surface, land or water, on an air cushion, with the vehicle, in one embodiment, as a model aircraft being a few inches above the surface. Complete stability is realized by the operation of the stability vanes as well as the general circular structure of the shell 11 which resists any tending of the vehicle to tilt.

The use of the vane control vanes and directional moment vanes allows the vehicle to be propelled forwardly, backwardly, and laterally in either direction as well as turning or rotating in any direction.

The anti-torque action of the fins 18 is particularly noteworthy because of the simplicity of structure as well as the completely effective anti-torque action. The fins 18, illustrated in the embodiment as numbering 3, may comprise any number with the stability vanes corresponding in number.

The vehicle may function as an aircraft flying above ground at a substantial distance by a reaction force generated by the propeller 15 with the thrust to weight ratio exceeding one. In this manner the vehicle may be controlled to hover, fly vertically and horizontally at any desired distance above the surface.

The present invention has been described as applied to an embodiment in which the thrust is generated by a motor driven propeller. It will however be understood that the flow of air may be produced by a jet engine suitably placed within the shell 11.

While the invention has been disclosed herein with respect to the embodiments illustrated in the drawings, it will be readily apparent that numerous variations and modifications may be made within the spirit and scope of the invention.

We claim:

In an air cushion vehicle,
- a disc shaped shell having a domed circular top opening and a circular lower opening of larger diameter,
- means defining an annular orifice of curved cross-sectional configuration between said top and lower opening including a plate axially disposed in said shell, the outer periphery of said plate and the inner periphery of said shell determining the cross-section of said annular orifice,
- said plate having a circular segment hinged for upward and downward movement to provide forward and rearward thrust for said vehicle,
- a propeller mounted on said plate for moving air into said top opening at a high velocity for exit out said lower opening at a low velocity,
- whereby an air cushion is created between said plate and a ground surface to maintain said vehicle a short distance above said ground surface,
- and a plurality of vertically extending fins joining said plate to said shell, said fins providing a differential pressure to counteract the rotational torque generated by said propeller.

References Cited
UNITED STATES PATENTS

| | | | |
|---|---|---|---|
| 2,996,266 | 8/1961 | Rebasti | 244—12 |
| 3,042,129 | 7/1962 | Wade | 185—7 |
| 3,050,146 | 8/1962 | Crim | 180—7 |
| 3,104,853 | 9/1963 | Klein | 244—12 |
| 3,106,261 | 10/1963 | Mackie | 180—7 |
| 3,107,071 | 10/1963 | Wessels | 244—23 |
| 3,167,145 | 1/1965 | Mackie | 180—7 |
| 3,170,276 | 2/1965 | Hall | 180—7 |
| 3,195,665 | 7/1965 | Beardsley | 180—7 |

A. HARRY LEVY, *Primary Examiner.*